(12) United States Patent
Polak

(10) Patent No.: US 7,252,772 B2
(45) Date of Patent: Aug. 7, 2007

(54) METHOD FOR PRODUCING AN ESSENTIALLY CHLORITE-FREE, STABLE AQUEOUS CHLORINE-OXYGEN SOLUTION, THE CHLORINE-OXYGEN SOLUTION OBTAINED BY MEANS OF SAID METHOD, AND THE USE OF THE SAME

(75) Inventor: Walter Polak, Salzburg (AT)

(73) Assignee: P&W Invest Vermogensverwaltungsgesellschaft mbH, Salzburg (AT)

(*) Notice: Subject to any disclaimer, the term of this patent is extended or adjusted under 35 U.S.C. 154(b) by 287 days.

(21) Appl. No.: 10/480,009

(22) PCT Filed: Jun. 5, 2002

(86) PCT No.: PCT/EP02/06178

§ 371 (c)(1),
(2), (4) Date: Jun. 1, 2004

(87) PCT Pub. No.: WO02/098791

PCT Pub. Date: Dec. 12, 2002

(65) Prior Publication Data

US 2004/0206707 A1 Oct. 21, 2004

(30) Foreign Application Priority Data

Jun. 7, 2001 (DE) ............... 101 27 729

(51) Int. Cl.
*C02F 1/76* (2006.01)
(52) U.S. Cl. ............... 210/754; 210/764; 210/167.11; 423/477
(58) Field of Classification Search ............... 210/754, 210/764, 167.11; 423/462, 477, 500, 506
See application file for complete search history.

(56) References Cited

U.S. PATENT DOCUMENTS

| 2,358,866 A | 9/1944 | MacMahon |
|---|---|---|
| 4,296,103 A | 10/1981 | Laso |
| 4,574,084 A * | 3/1986 | Berger .................. 424/601 |
| 4,725,437 A | 2/1988 | Kuhne |
| 5,009,875 A | 4/1991 | Kelley et al. |
| 5,165,910 A * | 11/1992 | Oikawa et al. ............. 423/477 |
| 5,972,238 A * | 10/1999 | Rimpler et al. ......... 252/187.21 |
| 6,051,135 A | 4/2000 | Lee et al. |
| 6,083,457 A * | 7/2000 | Parkinson et al. ............ 422/29 |

FOREIGN PATENT DOCUMENTS

| CA | 1268714 | 8/1996 |
|---|---|---|
| DE | 3403631 | 2/1989 |
| EP | 0 347 320 A1 | 12/1989 |
| EP | 0 200 156 | 4/1992 |
| EP | 0 200 157 | 7/1992 |

OTHER PUBLICATIONS

G. Gordon Is all Chlorine Dioxide Created Equal? XP 008009991, pp. 163-174, Apr. 2001.
Umwelt und Degussa, XP 000847684, Jul. 1999.

* cited by examiner

*Primary Examiner*—Robert Hopkins
(74) *Attorney, Agent, or Firm*—Fay Sharpe LLP

(57) ABSTRACT

The invention relates to a method for producing an essentially chlorite-free, stable, aqueous chlorine-oxygen solution. Said method comprises the following steps: (1) a hydrogen sulfate compound is dissolved in water, (2) an acid is added to the aqueous solution containing hydrogen sulfate in such a quantity that the pH value in the target final product in the form of the essentially chlorite-free, stable, aqueous chlorine-oxygen solution is maintained between approximately 3 and 5; (3) a peroxide compound is added; and (4) an aqueous chlorite solution is added dropwise in a quantity of between approximately 60 and 90 mole %, especially between 70 and 80 mole %, of chlorite, in relation to the concentration of peroxide compound. The invention also relates to the chlorine-oxygen solutions which can be obtained by means of said method.

11 Claims, No Drawings

METHOD FOR PRODUCING AN ESSENTIALLY CHLORITE-FREE, STABLE AQUEOUS CHLORINE-OXYGEN SOLUTION, THE CHLORINE-OXYGEN SOLUTION OBTAINED BY MEANS OF SAID METHOD, AND THE USE OF THE SAME

The present invention relates to a method for producing an essentially chlorite-free, stable aqueous chlorine-oxygen solution, the chlorine-oxygen solution obtained by means of said method, and the use of same.

In the area of water purification, in particular, such as in swimming pools, it is necessary to strictly adhere to the appropriate norms, guidelines and regulations. In this connection, there must be assurance with respect to the general framework, that it is as simple as possible, that it saves energy and is friendly to the environment, so that there is always a need for appropriately modified oxygen carriers in the form of chlorine systems, which are suitable for the specified purpose, but which do not generate free chlorine. Free chlorine has numerous drawbacks, since it is highly aggressive and, consequently, enters into side reactions which result in nitrogen chloride compounds, halogenated hydrochloric acids and suchlike. In addition to the toxicological aspects of the produced side products, the loss of chlorine due to side reactions is also of importance, since it is then no longer available for the intended sterilization and/or disinfection.

Thus, the oxidative properties of the compounds are to facilitate successful application in swimming pools, for example, as purification agent. This type of products constitute halogen-containing oxygen complexes, whereby complicated charge-transfer structures are being developed in part, which thus far have not been analyzed in detail, inasmuch as isolation of these complexes is extremely difficult. Such known anion complex is the "tetrachlorodecaoxide", which contains stabilized active oxygen in a chlorite matrix together with chlorine dioxide.

Several proposals already exist in the state of the art for this type of systems. EP 0 200 155 B1, EP 0 200 156 B1 and EP 0 200 157 B1 relate to chemically stabilized aqueous chlorite-matrix solutions for intravenous and perioperative administration in certain concentrations and/or the utilization of the aqueous solutions for producing medications for intravenous application in infectious conditions, caused by parasites, fungi, bacteria or mycoplasma, and/or for the treatment of tumors. In this context, only the medication and the different treatment methods are to the fore.

According to the teaching of DE 34 38 966 A1, a preparation is described which is constructed from a combination of stabilized chlorite matrices, especially tetrachlorodecaoxide (TCDO) and, preferably, equimolar quantities of an iron-porphyrin compound, whereby the two components are added together shortly before use. The preparation is utilized as bactericidal substance for disinfection, treatment of wounds for topical or intravenous application, for conservation or surface sterilization.

In the teachings of DE 34 03 631 C2 and EP 0 136 309 B1, a method is claimed for preparation of a chlorite solution, whereby a sulfate ion-containing aqueous solution with a pH value of <3 is mixed with a low concentration of a peroxy compound, which has in the end product a concentration of approximately 0.001 to 0.01 molar, whereupon an alkaline, aqueous chlorite solution is added in such quantity with resulting pH-value above 7.0, in particular between 7.5 and 8.0. Said aqueous chlorite solutions are utilized as biocidal agents for the treatment of skin diseases and skin irritations, as well as for water purification.

Furthermore, from U.S. Pat. No. 2,358,866 of 1944 an acidic stable chlorite solution is known whose stabilization is obtained by incorporation of stochiometric amounts, for example, of hydrogen peroxide with pH values from 2 to 7, at temperatures around 80° C. By adding hydrogen peroxide, formation of chlorine dioxide is suppressed, which acts corrosively and presents a multitude of drawbacks. Especially favorable results are obtained in the pH-range from 5 to 7.

The teaching of U.S. Pat. No. 4,296,103 relates to solutions of chloroxides, stabilized with perborate, which contain 4 to 15 parts by weight of sodium- or potassium perborate per liter of water, which, under addition of a peroxide or percarbonate, are employed for therapeutic purposes, by means of oral application. The solutions are composed of sodium- or potassium chlorite, hydrochloric acid, sulphuric acid, sodium- or potassium perborate as well as sodium peroxide. The use of perborates is essential here.

Accordingly, the invention is based on the object of making available a stable chlorine-oxygen solution which satisfies the requirements for water purification, especially in swimming pools, in other words, which can be applied without toxicological reservations, which is friendly to the environment, which is economically feasible and highly suited from an application technology aspect.

The above invention is solved according to the invention by a method for the preparation of an essentially chlorite-free, stable, aqueous chlorine-oxygen solution, having the following steps:

(1) Dissolving a hydrogen-sulfate solution in water;

(2) adding an acid to the aqueous hydrogen-sulfate-containing solution in such quantities that the pH value in the targeted end product in the form of the essentially chlorite-free, stable aqueous chlorine-oxygen solution is held between approximately 3 and 5;

(3) Addition of a peroxide compound;

(4) Drop-wise addition of an aqueous chlorite solution in an amount of approximately 60 to 90, especially 70 to 80 mol % of chlorite relative to the concentration of peroxide compound.

The hydrogen-sulfate compound to be employed in step (1) is first dissolved in water. Preferable use is made of alkali- or earthy base hydrogen sulfate. In a preferred specific embodiment, the hydrogen-sulfate compound is employed in an amount of approximately 5 to 20, especially 5 to 10 mol %, in relation to the peroxide concentration. Appropriate adjustment of the pH value in step (2) is done by acidification of the aqueous solution with a mineral acid. According to a preferred specific embodiment, a diluted sulphuric acid is employed, especially of approximately 1.0 to 10 $NH_2SO_4$.

Added in step (3) to said acidic aqueous solution is a peroxide compound in solid form or in aqueous solution form. Relative to the peroxide compound, preferable use is made of hydrogen peroxide or a peroxide of an alkali- or earthy base alkali metal, and, within the scope of the invention, other suitable peroxides are known to the person skilled in the art. Needless to say, other mixtures of peroxides can also be employed. The peroxide compounds employed in the method according to the invention serve primarily for stabilization of the obtained system.

Chlorite sodium chlorite is beneficially employed in step (4). According to a particularly appropriate embodiment of the invention-specific method, step (4) is executed within approximately ¼ to ½ hour, in other words, drop-wise addition of the aqueous chlorite solution is completed within the aforementioned time period. The purpose of this is to have the reaction take place in controlled slow fashion.

During the preparation process, the color of the solution changes from brown to yellow-green. It is assumed that the coloration of brown is attributable to the formation of the charge-transfer complex $Cl_4O_{10}^{2-}$, after which a yellow-green color develops, which remains. Accordingly, a complex exists which contains active oxygen, with the for tetrachlorodecaoxide characteristically light yellow-green coloration of the solution being similar in color to the yellow-green tint of the invention-specific chlorine-oxygen solution.

The chlorine-oxygen solution prepared according to the invention can be stored for months without losing its effectiveness and has especially the following benefits: It can easily be dosed and handled; there are absolutely no toxicological reservations; it is friendly to the environment; it can rationally be employed from an economical aspect, since preparation is cost-favorable, even on a large-scale basis, and it is highly suitable from an application technology point of view for the purification of water. Further benefits are, for example, use for surface disinfection, utilization as basic substance for medications in the treatment of the skin condition, but also for all other applications.

Object of the invention are also chlorite-free, stable, aqueous chlorine-oxygen solutions obtained according to the above method.

The invention-specific chlorine-oxygen solution can be employed with particular benefit in the purification of water, especially in purification of drinking water, in non-drinkable water for industrial purposes or for disinfection and/or sterilization of swimming pool- and bath-water. By appropriate dilution of the prepared solutions, it is easily possible to make available the desired dosage rate.

According to the invention, the chlorine-oxygen solution is used in such quantities that approximately 0.1 to 0.3 mol of chlorite are used as initial substance for each liter of water to be sterilized.

In the following, the invention is described in more detail making used of an example, which is not intended to limit the invention-specific teaching. Within the scope of the invention-specific disclosure, other specific embodiments are obvious to a person skilled in the art.

EXAMPLE 0.2 g of sodium-hydrogen sulfate are dissolved in 18 ml of water, after that, 1.2 ml of 10 N sulphuric acid is added and additionally adding, by careful stirring into the mixture, 3.8 ml of 30% hydrogen-peroxide solution. To said solution are added, in drop-wise fashion, within a time frame of 15 minutes, 15.7 ml of sodium-chlorite solution (25%). This solution changes in color from brown to yellow-green and then remains stable.

The invention claimed is:

1. A method for preparation of an essentially chlorite-free, stable, aqueous chlorine-oxygen solution, whereby during the reaction sequence in an acid, aqueous medium, a peroxide compound and an aqueous chlorite solution are employed comprising the following steps:
   (1) Dissolving a hydrogen-sulfate compound in water;
   (2) Adding an acid to the aqueous hydrogen-sulfate-containing solution in such quantity that the pH value is held between approximately 3 and 5 in the targeted end product in the form of the essentially chlorite-free, stable, aqueous chlorine-oxygen solution;
   (3) Addition of a peroxide compound;
   (4) Drop-wise addition of an aqueous chlorite-solution in an amount of approximately 60 to 90 mol % of chlorite relative to the concentration of the peroxide compound.

2. A method according to claim 1, wherein the hydrogen-sulfate compound in step (1), comprises an alkali- or earthy base alkali hydrogen sulfate.

3. A method according to claim 1 wherein the hydrogen-sulfate compound in step (1) is added in an amount of approximately 5 to 20 mol % in relation to the peroxide concentration.

4. A method according to claim 1 wherein the acid in step (2) comprises diluted sulphuric.

5. A method according to claim 1 wherein the peroxide compound in step (3) is selected from a group comprising a hydrogen-peroxide or a peroxide of an alkali- or earthy base alkali-metal.

6. A method according to claim 1 wherein the chlorite in step (4) comprises sodium-chlorite.

7. A method according to claim 1 wherein step (4) is performed within approximately ¼ to ½ hour.

8. The method according to claim 4, wherein the diluted sulphuric acid comprises 1.0 to 10 N sulphuric acid.

9. The method of claim 1 wherein the pH of the end product comprises more than 3.

10. A method for the purification of water or for disinfection of swimming pool water or bath water including the steps:
    (i) preparing an essentially chlorite-free, stable, aqueous chlorine-oxygen solution comprising:
       (1) Dissolving a hydrogen-sulfate compound in water;
       (2) Adding an acid to the aqueous hydrogen-sulfate-containing solution in such quantity that the pH value is held between approximately 3 and 5 in the targeted end product in the form of the essentially chlorite-free, stable, aqueous chlorine-oxygen solution;
       (3) Addition of a peroxide compound; and
       (4) Drop-wise addition of an aqueous chlorite-solution in an amount of approximately 60 to 90 mol % of chlorite relative to the concentration of the peroxide compound, and
    (ii) treating the water with an effective amount of the essentially chlorite-free, stable, aqueous chlorine-oxygen solution.

11. The method according to claim 10, wherein approximately 0.1 to 0.3 mol of chlorite are used as initial substance for each liter of water to be used.

* * * * *